(12) United States Patent
Mango

(10) Patent No.: US 8,091,643 B2
(45) Date of Patent: *Jan. 10, 2012

(54) IN SITU CONVERSION OF HEAVY HYDROCARBONS TO CATALYTIC GAS

(75) Inventor: Frank D. Mango, Houston, TX (US)

(73) Assignee: Petroleum Habitats, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,375

(22) Filed: Apr. 15, 2010

(65) Prior Publication Data

US 2010/0200234 A1    Aug. 12, 2010

Related U.S. Application Data

(63) Continuation of application No. 11/856,566, filed on Sep. 17, 2007, now abandoned, which is a continuation-in-part of application No. PCT/US2007/060215, filed on Jan. 8, 2007, application No. 12/761,375, which is a continuation of application No. 12/159,962, filed as application No. PCT/US2007/060215 on Jan. 8, 2007, now Pat. No. 7,845,414.

(60) Provisional application No. 60/757,168, filed on Jan. 6, 2006.

(51) Int. Cl.
*E21B 43/16* (2006.01)

(52) U.S. Cl. ....................... 166/309; 166/308.1; 166/401

(58) Field of Classification Search ........................ None
See application file for complete search history.

(56) References Cited

U.S. PATENT DOCUMENTS

| | | | |
|---|---|---|---|
| 2,768,793 | A | 10/1956 | Bonner |
| 2,854,396 | A | 9/1958 | Hunt |
| 3,180,902 | A | 4/1965 | Anderson et al. |
| 3,322,195 | A | 5/1967 | Brown et al. |
| 3,343,917 | A | 9/1967 | Friedman |
| 3,428,431 | A | 2/1969 | Billings |
| 3,719,453 | A | 3/1973 | Erdman |
| 3,934,455 | A | 1/1976 | Harrisberger |
| 4,108,552 | A | 8/1978 | Austin et al. |
| 4,205,956 | A | 6/1980 | Stedman |
| 4,352,673 | A | 10/1982 | Espitalie et al. |
| 4,426,452 | A | 1/1984 | Lasoski |
| 4,587,847 | A | 5/1986 | Malmquist et al. |
| 4,681,854 | A | 7/1987 | Feazel |
| 4,792,526 | A | 12/1988 | Ouellette et al. |
| 4,798,805 | A | 1/1989 | Issenmann |
| 5,082,787 | A | 1/1992 | Nolte et al. |
| 5,174,966 | A | 12/1992 | Durand et al. |
| 5,389,550 | A | 2/1995 | Ishida et al. |
| 6,225,359 | B1 * | 5/2001 | O'Rear et al. ............... 518/706 |
| 7,153,688 | B2 | 12/2006 | Mango |
| 7,608,170 | B1 * | 10/2009 | Ousey ............................ 201/21 |
| 2002/0002318 | A1 | 1/2002 | O'Rear et al. |
| 2002/0058581 | A1 | 5/2002 | Youngman et al. |
| 2006/0065400 | A1 | 3/2006 | Smith |
| 2006/0191686 | A1 | 8/2006 | Blauch et al. |

OTHER PUBLICATIONS

Mango, et al., The catalytic decomposition of petroleum into natural gas, Geochimica et cosmochimica Acta, 61:5347-5350 (Aug. 1997).
Mango, "The origin of light hydrocarbons," Geochimica et cosmochimica Acta 64: 1265-1277 (Sep. 1999).
Mango, "The light hydrocarbons in petroleum: a critical review," Org. Geochem., vol. 26, No. 7/8, pp. 417-440 (May 1997).
Mango, "Methane concentrations in natural gas: the genetic implications," Org. Geochem., 32:1283-1287 (Jul. 2001).
Littke, et al., "Gas Generation of Accumulation in the West Siberian Basin," AAPG Bulletin, 83:1642-1665 (Oct. 1999).
Domine, et al., "Towards a new method of geochemical kinetic modelling: implications for the stability of crude oils," Organic Geochemistry, 28:597-612 (Mar. 1998).
Mango, "Transition metal catalysis in the generation of petroleum and natural gas," Geochimica et Cosmochimica Acta., 56:553-555 (Dec. 1991).
Mango, et al., "The carbon isotopic composition of catalytic gas: A comparative analysis with natural gas," Geochimica et Cosmochimica Acta., 63:1097-1106 (Jan. 1999).
Medina, et al., "Low temperature iron- and nickel-catalyzed reactions leading to coalbed gas formation," Geochimica et Cosmochimica Acta., 64:643-649 (Feb. 2000).
Seewald, "Organic-inorganic interactions in petroleum-producing sedimentary basins," Nature, 426-327-333 (Nov. 2003).
Snowdon, L.R., et al.; "Identification of Petroleum Source Rocks Using Hydrocarbon Gas and Organic Carbon Content"; Geological Survey of Canada; Dept. of Energy, Mines and Resources; Paper 72-36; 1972.
Rafiqul, Islam; Study on the Formation of Gas Phase During Thermal Alteration of Petroleum; Journal of Bangladesh Academy of Sciences; vol. 19, No. 1 97-104, 1995.
Starobinets, I.S., et al.; Study of the Catalytic Effect of Rocks of Different Lithological Composition on the Formation of Gaseous Hydrocarbons from Natural Organic Compounds; Russia.
Jin, Qiang, et al.; Catalysis and hydrogenation: Volcanic activity and hydrocarbon generation in rift basins, eastern China; Applied Geochemistry 14 (1999) 547-558.
Jin, Qiang, et al.; Volcanic and Thermal-Water Activities and Hydrocarbon Generations in the Rift Basins, Eastern China; Chinese Journal of Geology; 2003; 38 (3):342-249.
PCT/US20071078660; International Search Report and Written Opinion mailed Jul. 23, 2009.

* cited by examiner

*Primary Examiner* — Angela M DiTrani
(74) *Attorney, Agent, or Firm* — Winstead PC

(57) ABSTRACT

A method of producing natural gas from a heavy hydrocarbon-containing subterranean formation includes: placing a catalyst comprising a transition metal into the formation, injecting an anoxic stimulation gas into the formation, and collecting the natural gas generated in the formation. The method may be performed outside the context of a subterranean formation under controlled conditions. Thus, a method of producing natural gas from bitumen includes: providing an anoxic mixture of heavy hydrocarbons and a catalyst having a transition metal, adding an anoxic stimulation gas to the mixture, and heating the mixture in the presence of the stimulation gas.

20 Claims, 3 Drawing Sheets

IN SITU CONVERSION OF HEAVY HYDROCARBONS TO CATALYTIC GAS

CROSS-REFERENCE TO RELATED APPLICATIONS

This application is a continuation of Ser. No. 11/856,566, filed on Sep. 17, 2007, now abandoned, which is a continuation-in-part of PCTUS2007060215, filed on Jan. 8, 2007, which is a non-provisional of Ser. No. 60/757,168, filed on Jan. 6, 2006. This application is a continuation-in-part of Ser. No. 12/159,962, filed on Jul. 2, 2008, now U.S. Pat. No. 7,845,414, which is a national stage entry of PCTUS2007060215, filed on Jan. 8, 2007, which is a non-provisional of Ser. No. 60/757,168, filed on Jan. 6, 2006.

FIELD OF THE INVENTION

The present invention relates in general to the production of natural gas from high molecular weight hydrocarbons.

BACKGROUND

Heavy hydrocarbons such as bitumen, kerogen, GILSONITE (a registered trademark of American Gilsonite Company for a mineral known as asphaltum, uintaite or uintahite) and tars are high molecular weight hydrocarbons frequently encountered in subterranean formations. These hydrocarbons range from thick viscous liquids to solids at ambient temperatures and are generally quite expensive to recover in useful form. Bitumen occurs naturally in tar sands in locations such as Alberta, Canada and in the Orinoco oil belt north of the Orinoco river in Venezuela. Kerogens are the precursors to fossil fuels, and are also the material that forms oil shales. Kerogens, believed to be the precursor to bitumens, are frequently found in sedimentary rock formations.

Heavy hydrocarbons in general, have been used in a number of applications such as in asphalt and tar compositions for paving roads and roofing applications and as an ingredient in waterproofing formulations. Importantly, they are a potentially valuable feedstock for generating lighter hydrocarbons. This is typically accomplished by thermal cracking and hydrogenolysis processes, for example.

Recovering heavy hydrocarbons whole or as lighter hydrocarbons and/or natural gas by thermal cracking in subterranean formations continues to be a challenge. The excessive temperatures necessary for thermal (or steam) cracking (about 850° C.) requires expensive, complex technology due to the special construction material to sustain high cracking temperatures and high energy input. Hydrogenolysis has limited utility when the recovery of lighter hydrocarbons is desirable. This is due to the difficulty of separating hydrogen from light olefins such as ethylene, propylene, and natural gas. Therefore, there is a continuing need for the development of methods for producing light hydrocarbons and natural gas from high molecular weight hydrocarbon feedstocks.

SUMMARY

According to one or more aspects of the present disclosure a method of producing natural gas from a heavy hydrocarbon-containing subterranean formation includes placing a catalyst comprising a transition metal into the formation, injecting a stimulation gas containing less than 1 ppm oxygen (hereafter referred to as 'anoxic') into the formation, and collecting the natural gas generated in the formation.

A method of producing natural gas from heavy hydrocarbons includes providing a mixture of heavy hydrocarbons and a catalyst that includes a transition metal, adding an anoxic stimulation gas to the mixture, and heating the mixture in the presence of the stimulation gas.

A method of forming natural gas includes: providing a mixture of heavy hydrocarbons and a catalyst having a transition metal; adding an anoxic stimulation gas to the mixture, and heating the mixture in the presence of the stimulation gas The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
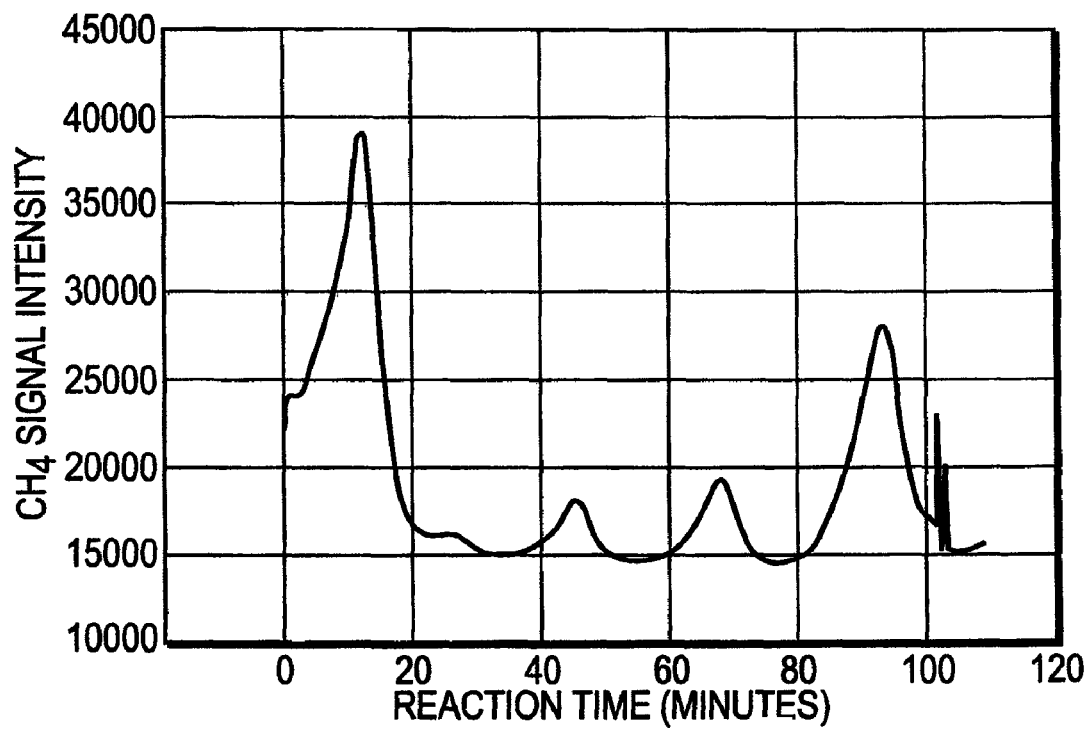
FIG. 1 is a plot showing the generation of methane and ethane over time from Barnett Shale in flowing helium at 250° C.

Embodiments disclosed herein are directed to a method in which various transition metal-containing catalysts present as zero- or low-valent metal complexes, are co-injected with sand or other proppant into reservoir rocks under sufficiently high pressures to fracture the rocks thus creating conduits of porous sand through which the transition metal complexes can pass into the regions of the formation containing heavy hydrocarbon materials. Alternatively, the catalysts may be delivered to hydrocarbon-containing sites within a formation using muds.

The method further includes closing the well (after introduction of stimulation gases) for sufficient time to allow metal catalyzed decomposition of bitumen (digestion) and gas generation. Thus, a method of producing natural gas from a heavy hydrocarbon-containing subterranean formation includes placing a catalyst which has at least one transition metal into the formation, injecting an anoxic stimulation gas into the formation (in some embodiments simultaneous with catalyst introduction), and collecting the natural gas generated in the formation.

Heavy Hydrocarbons: Heavy hydrocarbons as used herein include, but are not limited to all forms of carbonaceous deposits with sufficient hydrogen to convert to natural gas: $(-CH_x-) \rightarrow gas + (-CH_y-)$ where x>y. Examples include kerogens, solid hydrocarbons (GILSONITE, tars and the like), and bitumens. Such heavy hydrocarbons may be processed in situ in a formation. Alternatively, any of the hydrocarbons may also be reacted outside the context of a subterranean location, for example, in a batch reactor under carefully controlled conditions. Such conditions would include, for example, the substantial removal of oxygen which is prone to poisoning transition metal catalysts.

Catalyst: Typical source rocks, usually shales or limestones, contain about 1% organic matter, although a rich source rock might have as much as 20%. Source rocks convert their bitumen to natural gas at moderate temperatures (25 to 200° C.) in their natural state without hydrogen addition (see Experimental examples below). They do so chaotically, with random bursts of activity within periods of little or no activity, a phenomenon not uncommon in transition metal catalysis. Such behavior has been observed in a number of hydrogenation reactions including the hydrogenation of carbon monoxide, ethylene, and nitric oxide over Ni, Pt, Pd, Ir, Rh, and Ag (Eiswirth, M., 1993. Chaos in surface-catalyzed reactions. Ch. 6 in Chaos in Chemistry & Biochemistry, eds. R. J. Field & L. Gyorgyi, World Scientific Publishing Co., River Edge, N.J., USA, 141-174.) and in the hydrogenolysis of ethane over Ni and Pd (Kristyan, S., and Szamosi, J., 1992. Reaction kinetic surfaces and isosurfaces of the catalytic hydrogenolysis of ethane and its self-poisoning over Ni and Pd catalysts. Computers in Physics 6, 494-497.). Indeed, such chaotic behavior is an identifying characteristic of transition metal catalysis.

Therefore, in some embodiments, the method of converting heavy hydrocarbons to natural gas (oil-to-gas) may be accelerated in situ by injecting transition metals into reservoir rocks. The catalyst components may be obtained from an active source rock by isolation of the transition metals from active source rock. Alternatively, the source rock itself may be used without isolation of the individual active transition metals by generating a fine powder form of the source rock. One skilled in the art will recognize that under heterogeneous conditions high catalytic activity may be achieved by having catalyst particles with large surface area to volume ratios. Thus, it may be particularly beneficial to mill the source rock to very small particle size, for example, 10 nm-10,000 nm average diameter, though larger particles may be used as well.

In yet other embodiments, purified reagent grade transition metal components may be used and mixed in appropriate concentrations to reflect the naturally occurring compositions. For example, active source rocks may contain sufficient low-valent transition metals (100 to 10,000 ppb) to promote the reaction at reservoir temperatures (100° C. to 200+° C.) on a production time scale (days to years). Source rock activities may be determined experimentally in flowing helium at various temperatures. An assay procedure has been described by Mango (U.S. Pat. No. 7,153,688).

The transition metal may be a zero-valent transition metal, a low-valent transition metal, alloys, and mixtures thereof. Any transition metal that serves as a hydrogenation catalyst may be viable as a catalyst for the disproportionation reaction of heavy hydrocarbons. Various transition metals catalyze the hydrogenolysis of hydrocarbons to gas (Somorjai, G. A., 1994. Introduction to Surface Chemistry and Catalysis. John Wiley & Sons, New York. pg. 526); for example, $C_2H_6 + H_2 \rightarrow 2CH_4$. It has also been demonstrated that source rocks are catalytic in the hydrogenolysis of hydrocarbons (Mango, F. D. (1996) Transition metal catalysis in the generation of natural gas. Org. Geochem. 24, 977-984) and that low-valent transition metals are catalytic in the hydrogenolysis of crude oil (Mango, F. D., Hightower, J. W., and James, A. T. (1994) Role of transition-metal catalysis in the formation of natural gas. Nature, 368, 536-538). Furthermore, there is substantial evidence that low-valent transition metals are active agents in sedimentary rocks, see U.S. Pat. No. 7,153,688 which is incorporated herein by reference. Active source rock may include transition metals such as molybdenum, nickel, cobalt, iron, copper, palladium, platinum, rhodium, ruthenium, tungsten, rhenium, osmium, and iridium.

The catalyst components may be immobilized and introduced into the formation on a proppant, in some embodiments. Alternatively, catalysts may be injected as gases, metal carbonyls, for example, which could dissolve in the carbonaceous sediments, decompose with time, thus delivering to the sediments low-valent active metals such as Ni, Co, Fe. Alternatively, the catalyst may be introduced at various stages in oil-based muds, for example. Fine metal particles could also be injected directly with sand in reservoir fracturing, thus dispersing fine particles of active catalyst throughout the network of porous sand conduits that carry hydrocarbons from the reservoir to the surface. Catalysts may be coated with paraffins ($C_8$ to $C_{18}$) to protect them from oxygen-poisoning while on the surface and during injection into the reservoir.

Stimulation gas: Since active metals in natural sedimentary rocks are poisoned irreversibly by oxygen (U.S. Pat. No. 7,153,688), it is beneficial that the stimulation gas be anoxic (<1 ppm $O_2$). Trace amounts of oxygen picked up in processing can be easily and inexpensively removed with commercial oxygen scrubbers. The stimulation gas may include natural gas, gas depleted of methane, carbon dioxide, helium, argon, and nitrogen. For natural gas (catalytic gas) production, hydrogen gas may interfere with separation and therefore is not an ideal stimulation gas. Again, the stimulation gas may also be used not only for the fracturing, but also as a means of depositing the catalyst within the formation. In some embodiments, the stimulation of catalytic gas generation from bitumen in reservoir rocks may be achieved through a single well bore in a permeable reservoirs by injecting and withdrawing gas sequentially to create sufficient turbulence to stimulate chaotic gas generation or it may be achieved through multiple injection wells positioned to maximize continuous gas flow through the permeable reservoir to production wells that collect the injected gas plus catalytic gas. Production units would collect produced gas, injecting a fraction to maintain a continuous process and sending the remainder to market.

In reservoirs with insufficient permeability to sustain gas flow such as tight shales like the Mississippian Barnett Shale in the Fort Worth Basin (TX), fracturing the reservoir may be beneficial. Fracturing may be accomplished with injected sand or other appropriate proppant to create interlacing conduits of porous sand to carry injected gas through the reservoir to conduits of porous sands that carry the injected gas plus catalytic gas from the reservoir to production units. The flowing gas injected into the reservoir stimulates catalytic activity within the shale.

Fracturing may also be used to expose active catalytic sites inherent in shales and other heavy hydrocarbon-containing formations. Care should be taken in the fracturing process to minimize the exposure of these freshly exposed catalytic sites to oxygen and other oxidants that may deactivate low valent transition metal catalysts. Elemental oxygen in excess of 1 ppm can reduce the effectiveness of the catalytic reaction with heavy hydrocarbons. It has been observed, however, that this poisoning of catalytic activity is temperature sensitive. At temperatures lower than about 50° C. catalytic activity may be unaffected by the presence of oxygen, for example. For the common fracturing fluid water, a simple degassing procedure prior to fracturing may be sufficient to protect the nascent catalytic sites exposed during fracturing. In order to establish natural gas production after fracturing, the stimulation gas is simply allowed to flow over the newly fractured formation.

Injected gas may be natural gas produced from the deposit or natural gas produced from another deposit elsewhere. The process could be carried out by sequential injections where the reservoir is pressured, then allowed to stand and exhaust its induced pressure over time. This process could be repeated multiple times until the reservoir was exhausted of heavy hydrocarbons. The process could also be carried out in a continuous mode where gas is injected continuously into one well and withdrawn continuously from another. The two wells (or multiple wells) would be interconnected through a production unit that withdraws produced gas from the system sending excess gas to market and re-injecting the remainder to sustain continuous production.

Heavy hydrocarbon to natural gas: In addition to methods for in situ cracking of heavy hydrocarbons in a subterranean location, one may also produce natural gas from isolated heavy hydrocarbons in batch reactors, for example. To carry out such production the method entails mixing isolated heavy hydrocarbons (for example mined bitumen) with an active catalyst as described above. An anoxic stimulation gas may be introduced and the mixture heated under anoxic conditions.

Again the catalyst may be an active source rock ground into fine powder as described above. Alternatively, the active transition metal components may be isolated from the source rock or stock mixtures prepared from commercially available sources in proportions identified in high activity source rock.

The stimulation gas may be natural gas, natural gas depleted of methane, carbon dioxide, helium, argon, and nitrogen. In the context of batch reaction, such a stimulation gas may be provided as a flow while heating the bitumen catalyst mixture. Catalytic activity may be facilitated by heating in a range from about 25° C. to about 350° C. and from about 25° C. to about 250° C. in other embodiments. In particular embodiments, heating may be carried out in a range from about 100° C. to about 200° C. In all embodiments, it is beneficial that the stimulation gas be anoxic (<1 ppm $O_2$).

Methods disclosed herein may be used in the production of natural gas (catalytic gas). The aforementioned method for the disproportionation of bitumen and high molecular weight hydrocarbons may be used in such production. This may be carried out in batch reactors, or generated directly from tar sand sources where it may be collected in the field and distributed commercially.

The following examples are included to demonstrate particular embodiments of the present invention. It should be appreciated by those of skill in the art that the methods disclosed in the example that follows merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

Barnett Shale, 250° C., Helium. In a typical anoxic procedure, rocks are ground to powders (60 mesh) under pure argon to protect their inner surfaces from oxidation. These powders are then transferred to 5 ml ½ inch tubular brass reactors (new reactors were constructed for most experiments) that are secured at each end to ¼ inch copper tubing through Swagelok fittings. The tubing is attached to gas lines through valves to open and close the system to gas flow. Reactors (pressure-tight) are flushed with flowing gas (helium, 12 cc/min) for 10 minutes at room temperature to remove any air picked up in reactor assembly. They are pressure flushed (purified helium) five times by pressuring to 50 psi and venting to one atmosphere to remove any remaining oxygen and residual light hydrocarbons (adsorbed in the shales) that might interfere with the analysis. Reactors (now anoxic) are then heated (12.5° C./min) under purified helium flow to reaction temperatures where gas flow is continued at constant temperatures.

In this example, a sample of Barnett shale (Mississippian, Ft. Worth Basin TX) (3.4 g), ground to a powder in anoxic argon, was placed in a reactor and purged of any adsorbed oxygen by flowing anoxic helium (through a commercial oxygen scrubber) through the reactor at 350° C. for 20 minutes. Helium flow (12 mL/min) was continued at 250° C. for over one hour while the effluent (i.e. stimulation) gas was monitored for methane by a FID as shown in FIG. 1. The first methane peak (presumably adsorbed and catalytic methane from the 10 min purge at 350° C.) emerged at 12.5 min ($5.8 \times 10^{-5}$ g $CH_4$) followed by a flat baseline over the next 20 min showing that the sample was no longer releasing methane. Three sharp peaks of increasing intensity then appeared at 45 min. ($9.9 \times 10^{-6}$ g $CH_4$), 68 min. ($1.6 \times 10^{-5}$ g $CH_4$), and 94 min. ($5.6 \times 10^{-5}$ g $CH_4$). The final three peaks constitute $2.2 \times 10^{-2}$ mg $CH_4$/(g rock hr) which is greater than that for this rock under our usual conditions (in hydrogen) ($5.7 \times 10^{-3}$ mg $CH_4$/(g rock hr).

Example 2

Figure 2:
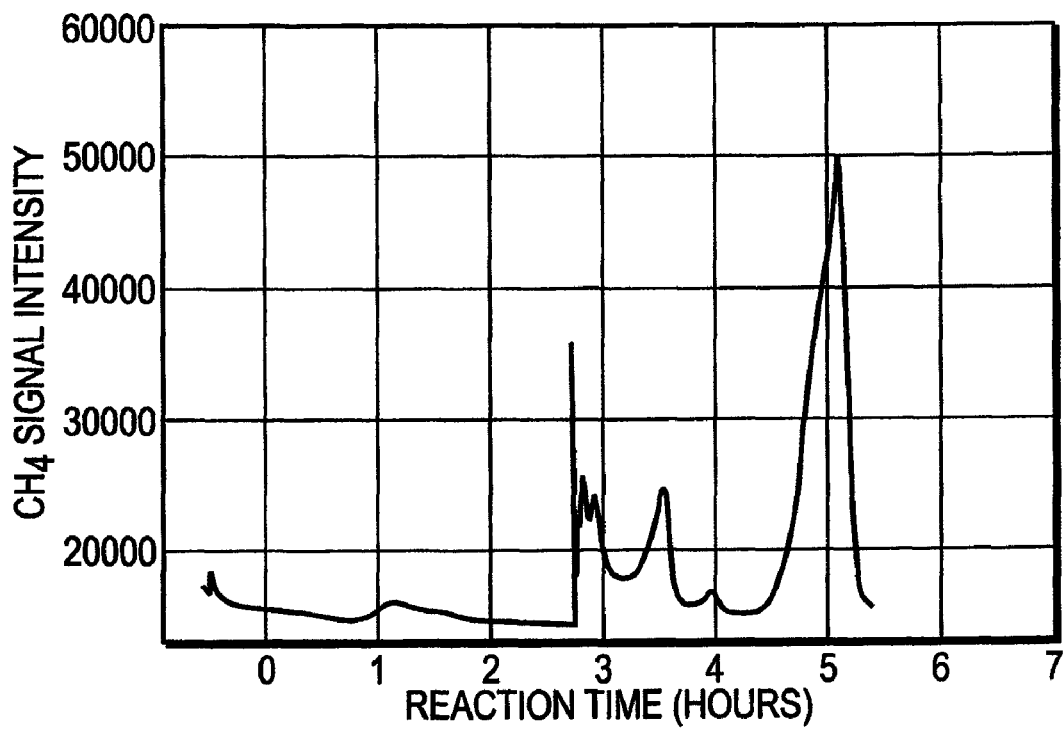
FIG. 2 is a plot showing the generation of methane and ethane over time from Monterey source rock KG-4 in flowing helium at 250° C.

Monterey Source Rock, 250° C., Helium. A sample of Monterey shale (Miocene, Calif.) (KG-4) (1.64 g) was analyzed under identical conditions under pure helium flow for about 7 hours (FIG. 2). After the initial peak of adsorbed gas (3 min., $2.7 \times 10^{-6}$ g $CH_4$), three very large peaks emerged after 5 hours of He flow, the first corresponding to $7.3 \times 10^{-4}$ g $CH_4$, the second (180 min. later) to $2.2 \times 10^{-4}$ g $CH_4$, and the third (285 min. after the first) to $1.1 \times 10^{-4}$ g $CH_4$, with an overall rate of 0.2 mg $CH_4$/(g rock hr), not materially different from that under hydrogen.

Example 3

Barnett Shale, 200° C., Helium. Pure helium (passed through an oxygen scrubber) was passed over a sample of Barnett Shale (2.88 g) (ground to a powder (60 mesh) in argon) at 200° C. for 140 minutes producing a burst of methane ($4 \times 10^{-2}$ mg) corresponding to a rate of $8.3 \times 10^{-3}$ mg $CH_4$/(g rock hr), a rate substantially greater than that obtained from the same experiment in hydrogen ($3.6 \times 10^{-5}$ mg $CH_4$/(g rock hr)) at this temperature and only slightly lower than that at 250° C.

It was observed that activity increased only slightly with temperature in helium suggesting rate suppression counteracting the usual Arrhenius exponential rate increase with temperature. The higher-than-expected activities observed in helium at 200° C. suggests higher than anticipated activities at subsurface temperatures and the expectation of promoting the conversion of heavy hydrocarbon to natural gas at moderate reservoir temperatures by injecting low-valent active transition metals into these reservoirs.

Example 4

A Monterey shale (Miocene, Calif.) sample generated methane at a rate of ~$6 \times 10^{-6}$ g $C_1$/(g rock hr) in hydrogen gas containing 3% propane under closed conditions (30 minutes) at 250° C. and generated very little methane at 200° C. under the same conditions (30 minutes). Under flowing helium at 200° C., the same rock converted its bitumen to gas at a rate of $1.3 \times 10^{-4}$ g $C_1$/(g rock hr). These results suggest that the mass-transfer stimulation gas may achieve two positive effects: 1) it transports hydrocarbons from heavy hydrocarbon deposits to active catalytic sites, and 2) it removes activity-suppressing agents (products and adsorbents) from the active sites catalyst surfaces.

Example 5

Figure 3A:
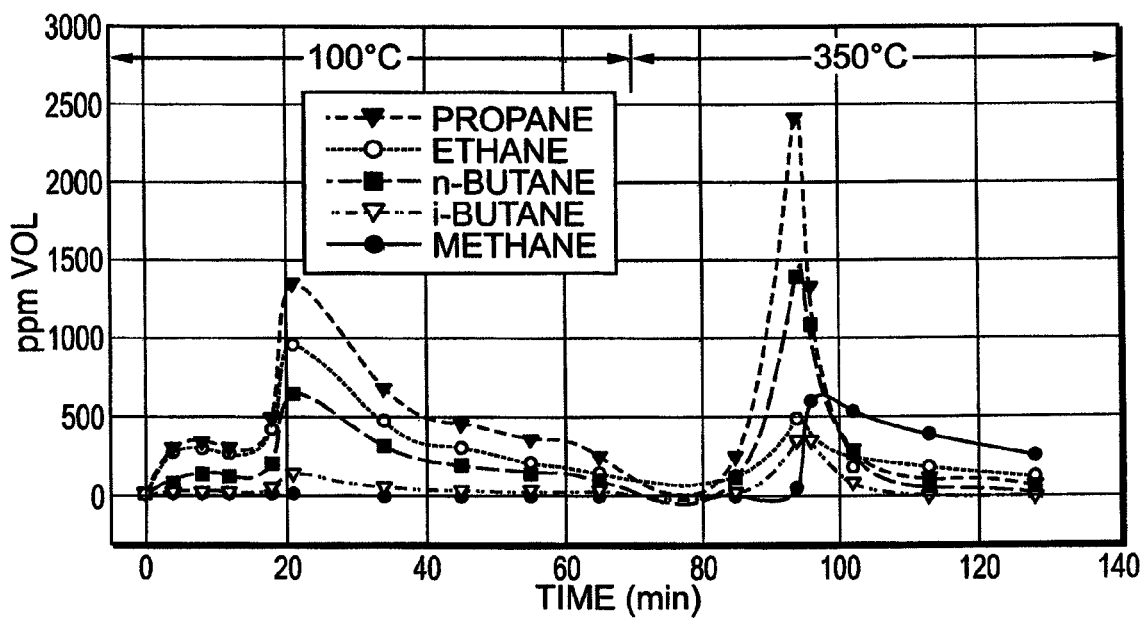
FIG. 3A is a plot showing gas chromatographic analyses of the amount and types of gasses produced from a sample of New Albany shale subject to an isothermal helium flow, at 100° C. and 350° C. under anoxic helium flow.
Figure 3B:
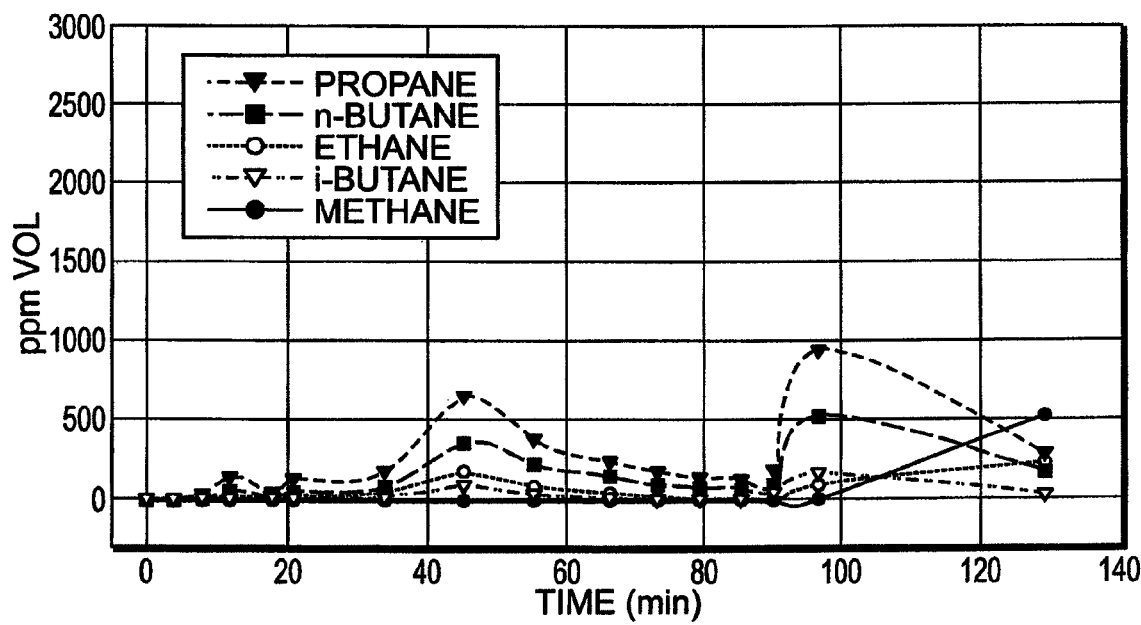
FIG. 3B is a plot showing gas chromatographic analyses of the amount and types of gasses produced from a sample of New Albany shale subject to a flow of helium with 10 ppm $O_2$ at 100° C. and 350° C.

Marine shales generate two distinct gases in the laboratory, one at high temperatures (>300° C.) from kerogen cracking, and the other at low temperatures (<100° C.) through the catalytic action of low-valent transition metals as shown in exemplary FIGS. 3A and 3B. The data in FIGS. 3A and 3B were obtained from a sample of New Albany shale subject to an isothermal helium flow, at 100° C. and 350° C., sequentially. FIG. 3A shows the system under an anoxic helium flow. FIG. 3B shows the system with a flow of helium with 10 ppm $O_2$. New Albany shale generates catalytic gas dominated by propane. Thus, the high-propane peaks at 100 and 350° C. are catalytic gas peaks. Thermal gas from kerogen cracking is represented by the methane peak (500 ppm vol) at 350° C. Catalytic gas is 90% of the total gas in FIG. 3A.

Low-temperature gas generation is unique. Generation rates are orders of magnitude higher, product compositions are dynamic, kinetics of generation are non-linear, and gas generation terminates on exposure to trace levels of oxygen. Equally surprising, different shales generate gases having different compositions. Barnett Shale, Fort Worth basin, generates a gas enriched in methane and near thermodynamic equilibrium in $C_1$-$C_3$ ($K=[(C_1)(C_3)]/[C_2)^2]$), while New Albany Shale, Illinois basin, generates a gas with mainly propane, and not at equilibrium, although it approaches equilibrium over time.

Example 6

Figure 4:
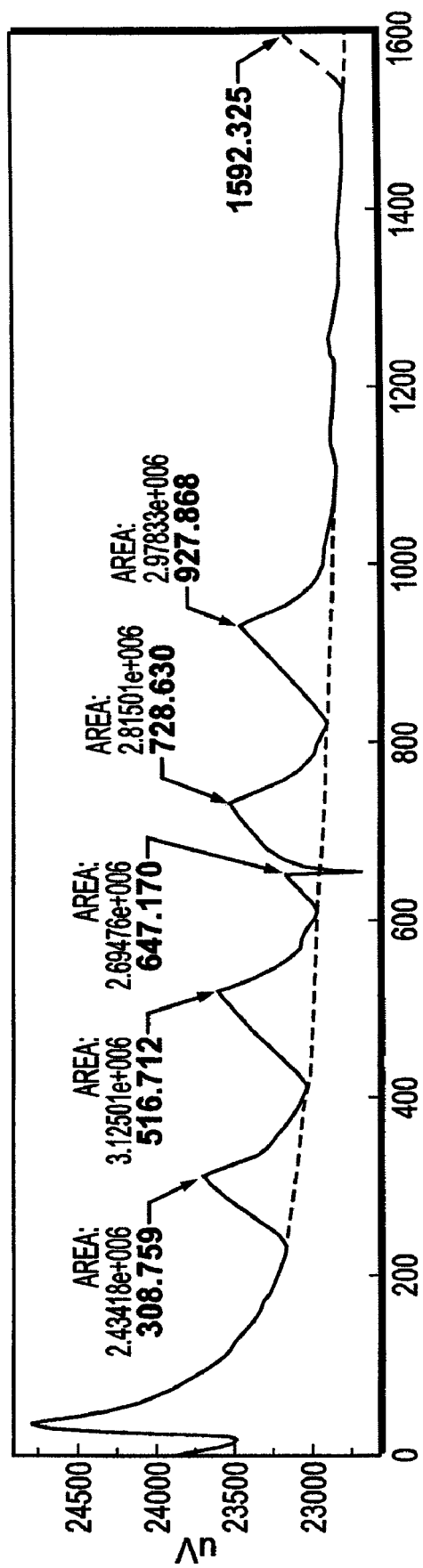
FIG. 4 is a plot showing gaseous hydrocarbon evolution over 21.7 hours at 50° C. from a sample of shale from Black Warrior Basin.

Cuttings of marine shale from the Black Warrior Basin were ground to powders (60 mesh) in argon (1.31 g) and placed in a metal reactor and prepared for reaction as described before (pressure-purging the reactor with pure helium, etc). The reactor was then warmed to 50° C. under anoxic helium flow and the products in the effluent stream were analyzed by FID. The product gas stream was passed directly into the FID bypassing all cold traps. The trace represents the FID signal over time (minutes). Since the product stream bypassed all cold traps, the four peaks represent all gaseous hydrocarbons generated from the shale. This produced four distinct signals of gas production at 308.8, 516.7, 728.6, and 927.9 minutes, as shown in FIG. 4, corresponding to 70 µg gas/g shale. This experiment provides the clearest example of chaotic kinetics and thus additional evidence of catalytic action by transition metals (Field & Gyorgyi, Chaos in Chemistry & Biochemistry, World Scientific Pub. Co, River Edge, N.J., 1993; Eiswirth, Ch 6 in Chaos in Chemistry & Biochemistry, 1993).

Low-temperature gas forms at temperatures comparable to geological reservoir temperatures, but only when there is gas flow under anoxic conditions. This is achieved in the laboratory by grinding the shales in pure argon to expose inner anoxic surfaces, and then passing purified helium over the surfaces at constant temperature. In a typical example, a Paleozoic marine shale (Chattanooga/Floyd) from the Black Warrior Basin (Alabama/Mississippi) generated 70 µg gas/(g shale) in 21.7 hours at 50° C.

Two things are remarkable about these results. First, the activity is robust at a very low temperature. Rates of most chemical reactions diminish with decreasing temperatures. Higher reaction temperatures may be suppressing activity or otherwise altering the chaotic kinetics of catalytic gas generation. Without being bound by mechanism, anoxic gas flow stimulates gas generation at very low temperatures, in this example at 50° C., and thus, gas-flow stimulated gas generation may be viable at all subsurface temperatures. Generating gas without injecting heat may be viable because of the thermodynamic stability of light hydrocarbons over the heavier hydrocarbons. The conversion of pentane to methane, propane, and carbon at 27° C., for example, is exothermic by −15.81 kcal/mole (Stull et Al., The Chemical Thermodynamics of Organic Compounds, John Wiley & Sons, N.Y, 1969). Thus the conversion of bitumen to gas is energetically favorable at most reservoir temperatures and requires no heat input to drive conversion. The second remarkable thing is the duration of sustained high activity, in this case over 22 hours. This means that a shale like this one in the subsurface at this temperature would generate about 4 MMcft/(acre-ft year) under gas-flow stimulation.

Advantageously, the methods describe herein provide a means for recovery useful catalytic gas from heavy hydrocarbons in situ from subterranean formations. When used in situ at the site of a formation, the conversion of heavy hydrocarbon extends the useful lifetime of reservoir enhancing the oil recovery process. The same process may be duplicated under controlled conditions in batch reactors for commercial production of natural gas. Furthermore, the availability of certain heavy hydrocarbons, such as bitumen, from renewable resources may provide an environmentally sound means for natural gas production.

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

From the foregoing detailed description of specific embodiments of the invention, it should be apparent that a novel method for converting bitumen to natural gas has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for generating catalytic natural gas in a subterranean formation comprising heavy hydrocarbons and catalytic sites, the method comprising:

fracturing the subterranean formation under conditions that do not deactivate the catalytic sites, wherein the catalytic sites comprise at least one transition metal;

adding an anoxic stimulation gas having a concentration of less than 1 ppm $O_2$ to the fractured subterranean formation, wherein the anoxic stimulation gas is not hydrogen; and generating a catalytic natural gas from the heavy hydrocarbons by a disproportionation reaction promoted by the catalytic sites.

2. The method of claim 1, further comprising producing the catalytic natural gas generated.

3. The method of claim 2, further comprising injecting a portion of the produced catalytic natural gas back into the subterranean formation.

4. The method of claim 1, wherein the at least one transition metal is selected from the group consisting of a zero-valent transition metal, a low-valent transition metal, alloys, and mixtures thereof.

5. The method of claim 1, wherein the at least one transition metal is selected from the group consisting of molybdenum, nickel, cobalt, iron, copper, palladium, platinum, rhodium, ruthenium, tungsten, osmium, rhenium, and iridium.

6. The method of claim 1, wherein the anoxic stimulation gas comprises at least one gas selected from the group consisting of natural gas, carbon dioxide, helium, argon and nitrogen.

7. The method of claim 1, wherein the adding the anoxic stimulation gas is performed while performing the fracturing in the formation.

8. The method of claim 1, further comprising withdrawing the anoxic stimulation gas.

9. The method of claim 8, wherein the anoxic stimulation gas is added and withdrawn through a single wellbore.

10. The method of claim 8, wherein the anoxic stimulation gas is added through multiple wells.

11. The method of claim 1, wherein the anoxic stimulation gas is flowing.

12. The method of claim 11, wherein the anoxic stimulation gas is continuously flowing.

13. The method of claim 1, where the anoxic stimulation gas is added sequentially to the subterranean formation.

14. A method for producing catalytic natural gas from a heavy hydrocarbon containing subterranean formation, comprising:

injecting into the subterranean formation an anoxic stimulation gas having less than about 1 ppm of $O_2$;

introducing a catalyst comprising a transition metal into the subterranean formation;

fracturing the subterranean formation;

generating catalytic natural gas in the subterranean formation from the heavy hydrocarbons by a disproportionation reaction promoted by the catalyst; and producing the generated catalytic natural gas from the subterranean formation.

15. The method of claim 14, wherein the anoxic stimulation gas is not primarily hydrogen.

16. The method of claim 14, wherein the catalyst comprises a transition metal is selected from the group consisting of a zero-valent transition metal, a low-valent transition metal, alloys, and mixtures thereof.

17. The method of claim 14, wherein the transition metal is selected from the group consisting of molybdenum, nickel, cobalt, iron, copper, palladium, platinum, rhodium, ruthenium, tungsten, osmium, rhenium, and iridium.

18. The method of claim 14, wherein the introducing the catalyst comprises exposing the catalyst contained in the subterranean formation in response to the fracturing the subterranean formation.

19. The method of claim 14, wherein the introducing the catalyst comprises injecting the catalyst into the subterranean formation.

20. The method of claim 14, wherein the introducing the catalyst comprises injecting the catalyst into the subterranean formation while performing the fracturing of the formation.

* * * * *